Patented Mar. 3, 1936

2,032,772

UNITED STATES PATENT OFFICE 2,032,772

PRODUCING HYDROXY COMPOUNDS OF THE ANTHRAPYRIMIDINE SERIES

Otto Schlichting and Karl Koeberle, Ludwigshafen-on-the-Rhine, Germany, assignors to General Aniline Works, Inc., New York, N. Y., a corporation of Delaware No Drawing. Application August 2, 1934, Serial No. 738,162. In Germany August 5, 1933

7 Claims. (Cl. 260—32)

The present invention relates to hydroxy compounds of the anthrapyrimidine series and a process of producing same.

We have found that hydroxy compounds of the anthrapyrimidine series are obtained in a simple manner by subjecting anthrapyrimidines i. e. anthrapyrimidine or anthradipyrimidine or their derivatives to a treatment at an elevated temperature with sulphuric acid, for example fuming sulphuric acid, or with anhydrous sulphuric acid, for example monohydrate, or with sulphuric acid of from 85 to 96 per cent strength, if desired with an addition of boric acid. The addition of boric acid has proved of advantage in the hydroxylation of 1,9-anthrapyrimidines, anthradipyrimidines and aminoanthrapyrimidines, whereas the hydroxylation of halogen amino-1,9-anthrapyrimidines is also very readily effected without such an addition and frequently even at a temperature of between 90° and 100° C.

The hydroxy compounds of the anthrapyrimidine series thus obtainable in a state of high purity are either dyestuffs or may be employed as intermediate products in the manufacture of dyestuffs. They may be purified by usual methods, for example by crystallization or sublimination, or by converting them into their salts by means of strong acids.

The following examples will further illustrate how the said invention may be carried out in practice but the invention is not restricted to these examples. The parts are by weight.

Example 1

20 parts of 1,9-anthrapyrimidine, obtainable by condensing alpha-aminoanthraquinone with formamide, are dissolved in 200 parts of sulphuric acid of 96 per cent strength and after the addition of 10 parts of boric acid, the solution is heated to from 180° to 200° C., until a sample poured into water dissolves on the addition of dilute caustic soda solution, giving a yellow coloration, which in most cases occurs even after one hour. After cooling, the mixture is poured into water. The reaction product formed is filtered by suction and washed until neutral. It is obtained in a good yield and forms a yellow powder which after being recrystallized, for example from trichlorbenzene, is obtained in the form of yellow needles. According to analysis and its properties it is a hydroxy-1,9-anthrapyrimidine in which the hydroxy group is in the 4-position. It dissolves in caustic soda solution giving a yellow coloration, and in concentrated sulphuric acid giving an orange-yellow coloration.

By heating the thus obtained 4-hydroxy-1,9-anthrapyrimidine with 20 per cent aqueous ammonia to about 160° to 180° C., 4-amino-1,9-anthrapyrimidine is obtained in a quantitative yield. This reaction proves that the hydroxy-1,9-anthrapyrimidine contains the hydroxy group in the 4-position.

Example 2

20 parts of 5-amino-1,9-anthrapyrimidine are dissolved in 200 parts of sulphuric acid of 96 per cent strength, and, after the addition of 10 parts of boric acid, the solution is heated to from 180° to 200° C. until a sample completely dissolves in dilute caustic soda solution giving a red coloration. The solution is worked up in the usual manner and the reaction product is obtained in a good yield in the form of a dark blue powder. By recrystallization it is obtained in the form of violet needles. According to its behaviour it is a 5-amino-hydroxy-1,9-anthrapyrimidine. It dissolves in alkaline, especially in hot alkaline, solutions giving a red coloration; in concentrated sulphuric acid it dissolves giving a golden-yellow coloration which by the addition of formaldehyde changes to green.

Example 3

10 parts of chlor-5-amino-1,9-anthrapyrimidine, obtainable by introducing chlorine into a solution of 5-amino-1,9-anthrapyrimidine in chlorsulphonic acid in the presence of iodine, are dissolved in 100 parts of sulphuric acid of 87 per cent strength and the solution is heated to about 100° C. for about ½ to 1 hour. After cooling, the solution is poured into water and the reaction product formed is filtered off by suction and washed until neutral. It is obtained in a good yield and forms a violet powder which may be recrystallized from trichlorbenzene yielding a glittering violet crystalline powder. According to analysis and its properties it proves to be a 5-amino-hydroxy-1,9-anthrapyrimidine. In contrast to the product obtained according to Example 2, it dissolves in hot dilute caustic soda solution giving a greenish blue coloration, and in concentrated sulphuric acid giving an orange-yellow coloration which by the addition of formaldehyde changes to blue; when diluting the sulphuric acid solution with water a blue coloration is likewise obtained.

Instead of a sulphuric acid of 87 per cent strength, a sulphuric acid of 96 per cent strength or sulphuric acid monohydrate may also be employed.

Example 4

100 parts of chlor-4-amino-1,9-anthrapyrimidine, obtainable by treating a solution of 4-amino-1,9-anthrapyrimidine in nitrobenzene with sulphuryl chloride, are heated to from 180° to 200° C. in 500 parts of sulphuric acid, while stirring, and kept at this temperature until a sample has become completely soluble in alkalies. The solution is then allowed to cool and poured into ice-cold water, and the reaction product formed is filtered off by suction, washed until neutral and dried. The 4-amino-hydroxy-1,9-anthrapyrimidine thus obtained is a yellow powder which crystallizes in the form of coarse needles; it dissolves in concentrated sulphuric acid giving an orange red coloration and dyes acetate silk yellow shades.

By treating brom-2-amino-1,9-anthrapyrimidine in the manner described in this example with sulhpuric acid at about 150° C., an orange red 2-amino-hydroxy-1,9-anthrapyrimidine is obtained.

Example 5

20 parts of 1,9,5,10-anthradipyrimidine are dissolved in 200 parts of a sulphuric acid of 96 per cent strength and, after the addition of 10 parts of boric acid the solution is slowly heated to from 100° to 130° C. As soon as a sample dissolves in dilute caustic soda solution giving a clear bluish-red coloration, heating is discontinued. By working up in the usual manner the reaction product is obtained in a good yield in the form of a violet powder; by recrystallizing it from trichlorbenzene it is obtained in the form of brownish-red needles. According to analysis and its properties it proves to be a hydroxy-1,9,5,10-anthradipyrimidine which has most probably the formula

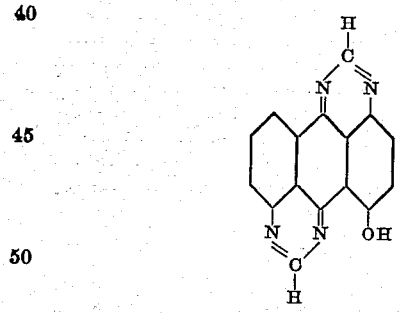

It dissolves in alkalies and in concentrated sulphuric acid giving a bluish-red coloration; it also dissolves in organic solvents of high boiling point giving a red coloration and presenting a beautiful green fluorescent effect.

Example 6

10 parts of dichlor-4-hydroxy-1,9-anthrapyrimidine, obtainable by heating a solution of 4-hydroxy-1,9-anthrapyrimidine in nitrobenzene with sulphuryl chloride to from 70° to 80° C., are heated to from 200° to 220° C. for 2 hours with a mixture of 10 parts of boric acid and 200 parts of a sulphuric acid of 96 per cent strength. After cooling the reaction mixture is diluted with water to contain about 45 per cent of sulphuric acid and the crystallized yellow sulphate is filtered by suction. When washed with water until neutral it assumes a red coloration. After drying the reaction product is a brownish-red crystalline powder which melts at from 320° to 325° C. with decomposition. By repeated purification by converting it into the sulphate and recrystallizing it for example from trichlorbenzene, yellowish-brown needles are obtained with melt at from 333° to 335° C. with decomposition. By analysis the compound is identified as being a chlordihydroxyanthrapyrimidine. It dissolves in concentrated sulphuric acid giving a yellow coloration, as well as in alkaline liquors and in organic solvents of high boiling point.

Example 7

20 parts of 1,9-anthrapyrimidine-8-diazonium sulphate obtainable by diazotizing 8-amino-1,9-anthrapyrimidine with nitrosylsulphuric acid in the presence of concentrated sulphuric acid are heated, while stirring, with 200 parts of 96 per cent sulphuric acid at from 120° to 130° C., until a sample dissolves in dilute caustic soda solution giving a clear solution. The liquid is then poured into water, the resulting precipitate is sucked off, which after washing and drying forms a dark yellow powder. By recrystallization from trichlorbenzene golden-yellow needles are obtained which melt at 230° to 231° C. and according to analysis are 8-hydroxy-1,9-anthrapyrimidine. The compound dissolves in concentrated sulphuric acid giving an orange-red coloration and in dilute caustic soda solution giving a violet-red coloration.

If 1,9-anthrapyrimidine-5-diazonium sulphate is treated in the manner described 5-hydroxy-1,9-anthrapyrimidine is obtained. It is an orange-brown crystalline powder which melts at 272° to 274° C. and dissolves in concentrated sulphuric acid giving a red coloration and in dilute caustic soda solution gixing a bluish-red coloration. It yields a yellow vat.

Example 8

A mixture of 6- and 7-aminoanthrapyrimidine is diazotized by means of nitrosylsulphuric acid in the presence of concentrated sulphuric acid. The mixture of the diazonium sulphates thus obtained is heated to 120° to 130° C. with concentrated sulphuric acid in the manner described in Example 7. After working up a mixture of 6- and 7-hydroxy-ainthrapyrimidine is obtained in the form of yellow needles which melts at 228° to 230° C., dissolves in concentrated sulphuric acid giving an organge red coloration and in dilute caustic soda solution giving a violet red coloration. It yields a yellow vat.

Example 9

10 parts of 5-amino-py-C-phenyl-1,9-anthrapyrimidine obtainable by heating 5-amino-1-benzoylaminoanthraquinone to 150° C. with gaseous ammonia under pressure in the presence of phenol, are heated to 200° C., while stirring, with 100 parts of 96 per cent sulphuric acid and 10 parts of boric acid, until a sample dissolves in dilute caustic soda solution. After working up, the reaction product is obtained in the form of violet-red needles which dissolve in concentrated sulphuric acid giving an orange coloration and in dilute soda solution giving a bluish-red coloration. It yields a brownish-red vat.

Example 10

A mixture of 25 parts of 5-cyano-1,9-anthrapyrimidine obtainable by heating 1,9-anthrapyrimidine-5-diazonium sulphate with cuprous cyanide, 25 parts of boric acid and 250 parts of 96 per cent sulphuric acid are heated for about 2 hours to 200° C. The solution is worked up in the manner above described. An orange-yellow crystalline powder is obtained which probably is a hydroxy-1,9-anthrapyrimidine-5-carboxylic acid. It dissolves in concentrated sulphuric acid giving a violet-red coloration and a red fluorescence, and in dilute caustic soda solution giving a yellow coloration and a green fluorescence.

*Example 11*

10 parts of dichlor-5-amino-1,9-anthrapyrimidine, obtainable by heating 5-amino-1,9-anthrapyrimidine to 60° to 70° C. with sulphuryl chloride in the presence of nitrobenzene, are heated at 120° to 130° C. with 10 parts of boric acid in 100 parts of 96 per cent sulphuric acid, until hydrogen chloride no longer escapes. The solution is then diluted with water to form a 45 per cent sulphuric acid, the precipitate formed filtered off by suction and washed until neutral. The violet reaction product is recrystallized from trichlorbenzene yielding violet needles melting at 293° C. According to analysis the product is a chlorohydroxy - 5 - amino-1,9- anthrapyrimidine. It dissolves in concentrated sulphuric acid giving a yellow coloration which on addition of formaldehyde turns blue. It is hardly soluble in caustic soda solution. It yields an orange-red vat.

What we claim is:—

1. A process of producing hydroxy compounds of the anthrapyrimidine series which comprises treating anthrapyrimidine with at least 85 per cent sulphuric acid at a temperature above about 90° C.

2. A process of producing hydroxy compounds of the anthrapyrimidine series which comprises treating anthrapyrimidines with fuming sulphuric acid at a temperature above about 90° C.

3. A process of producing hydroxy compounds of the anthrapyrimidine series which comprises treating anthrapyrimidines with sulphuric acid in the presence of boric acid at a temperature above about 90° C.

4. α-hydroxyanthrapyrimidines containing up to two hydroxy groups.

5. 4-hydroxy-1,9-anthrapyrimidine.
6. 5-hydroxy-1,9-anthrapyrimidine.
7. 8-hydroxy-1,9-anthrapyrimidine.

OTTO SCHLICHTING.
KARL KOEBERLE.